United States Patent
Petri et al.

[11] Patent Number: 6,076,886
[45] Date of Patent: Jun. 20, 2000

[54] COVER OF AN OPENABLE MOTOR VEHICLE ROOF

[75] Inventors: Volker Petri, Aidlingen; Reinhold Mickeler, Altdorf; Werner Herlemann; Hans Benda, both of Aidlingen; Hans Gunter Lehnen, Wadern-Noswendel; Roland Lorig, Sinspelt; Stefan Schmitt, Trier; Johann Hertel, Neuried; Walter Schatzler, Starnberg; Hans Brandner, Dachau; Thomas Schröferl, Hohenschaftlarn, all of Germany

[73] Assignees: IEE International Electronics & Engineering S.A.R.L., Luxembourg, Luxembourg; Webasto Karosseriesysteme GmbH, Stockdorf, Germany

[21] Appl. No.: 09/184,954

[22] Filed: Nov. 3, 1998

[30] Foreign Application Priority Data

Nov. 15, 1997 [DE] Germany ............... 197 50 711

[51] Int. Cl.$^7$ ........................................ B60J 7/00
[52] U.S. Cl. .................. 296/216.09; 49/27; 200/61.43
[58] Field of Search ............... 296/216.06, 216.09, 296/223; 49/27; 200/61.43; 318/468

[56] References Cited

U.S. PATENT DOCUMENTS

| 3,056,628 | 10/1962 | Golde ........................... 200/61.43 X |
| 4,826,232 | 5/1989 | Wissler ........................... 296/216.09 |
| 5,459,962 | 10/1995 | Bonne et al. ..................... 200/61.43 X |
| 5,592,060 | 1/1997 | Racine et al. ......................... 318/469 |

FOREIGN PATENT DOCUMENTS

| 93 17 291 | 2/1995 | Germany . |
| 44 27 537 | 2/1996 | Germany . |
| 297 04 030 | 7/1997 | Germany . |

Primary Examiner—Dennis H. Pedder
Attorney, Agent, or Firm—Nixon Peabody LLP; David S. Safran

[57] ABSTRACT

A cover (2) of an openable motor vehicle roof (1) has a cover plate (3) which is surrounded in at least one edge area by a foamed-on or injected-on plastic frame (4) which, at the same time, is used to connect at least one attachment part (inside cover sheet 6) of the cover. At least one sensor element (8) is integrated into the plastic frame (4) and it signals pinching of a body part or an article (11) by means of partial deformation of the plastic frame (4) when cover (2) is closed.

17 Claims, 2 Drawing Sheets

COVER OF AN OPENABLE MOTOR VEHICLE ROOF

BACKGROUND OF THE INVENTION

1. Field of the Invention

The invention relates to a cover of an openable motor vehicle roof with a cover plate which is surrounded in at least one edge area by a foamed-on or injected-on plastic frame.

2. Description of Related Art

German Utility Model No. DE 297 04 030 U1 discloses a cover of a sliding roof in which the cover plate, formed of a transparent panel, and an attachment part, which lies underneath in edge regions of the transparent panel and is in the form of a beveled inside cover sheet, are joined to one another by a plastic frame which has been injected or foamed on. The plastic frame is configured on its outer periphery to hold a sealing part.

According to published German Patent Application DE 44 27 537 A1, sealing parts for frames can be made as hollow chamber profiles into which a pressure-sensitive, strip-shaped sensor element is integrated for detection of pinching when the cover is being closed. Insertion of the sensor element into the hollow chamber seal in an extrusion process and the attachment of the seal to the cover represent complex production and assembly steps which make the production of a sliding roof cover very expensive.

German Utility Model DE-U1 93 17 291 discloses a control profile for providing pinch protection which can be attached by force-fit or form-fit directly to a sliding roof part. This profile is made in several parts, and thus, results in increased assembly cost.

SUMMARY OF THE INVENTION

The primary object of the present invention is to provide a cover for an openable motor vehicle roof which has means for detecting a case of pinching, and which can be economically produced.

This object is achieved in accordance with the present invention by at least one sensor element being integrated into the plastic frame and the sensor being actuated, in the case of pinching when cover is closed, due to partial deformation of the plastic frame producing signals indicating pinching of a body part or an article by the cover.

According to the central idea of this invention a pressure-sensitive sensor element is directly integrated into an at least partially deformable foamed or injected plastic frame of a cover. This integration enables especially simple connection of a sensor element into the cover. Furthermore, a protected arrangement of the sensor element is achieved, since the plastic frame which covers the sensor element has higher stability than, for example, a rubber seal. Finally, establishment of contact between the sensor element and evaluation logic is also especially facilitated since the electrical terminal connections can, likewise, be easily embedded at the same time in the plastic frame when the glass pane and the reinforcing parts are peripherally injected or foamed.

According to an advantageous embodiment of the invention, on the bottom of the plastic frame there is a groove which is used to hold the sensor element. This groove can be produced, for example, by a tool part which is used at the same time to hold the sensor element when it is peripherally foamed or injected. The sensor element can, however, as easily be inserted afterwards, for example, by cementing as an alternative, into a groove produced during peripheral injection or foaming by means of a molding.

According to an advantageous embodiment of the invention, the sensor element has at least one pressure nub facing the outside edge of the plastic frame. This pressure nub is used to increase the spot pressure when the plastic frame deforms in the case of pinching, so that a higher sensitivity of the sensors is achieved.

Alternatively, there can also be at least one pressure nub on an inside wall of the plastic frame facing the sensor element, as is already known in similar form of a wall of a rubber seal from the above-mentioned German Patent Application DE 44 27 537 A1.

According to another advantageous embodiment, it is provided that the groove is filled by an elastic material which is softer than the material of the plastic frame. This filling with softer material can be done especially easily by a two-component injection process. The softer elastic material is used, on the one hand, to cover the sensor element from below, and on the other hand, to transfer the compressive forces acting on the outside edge of the frame to the sensor element.

For easier transfer of compressive forces, it is advantageous if a contact surface on the outside edge of the cover is tilted obliquely forward and down. By linear contact of a pinching article on the projecting lower outside edge of the cover, this form facilitates deformation of the plastic frame, and thus detection of pinching. Here, it is especially advantageous if a groove in the plastic frame, which can be, for example, V-shaped or trapezoidal, extends roughly to the upper edge of the plastic frame and the overlying area forms a relatively thin-walled hinge for a rib of the plastic frame which extends to the outside edge. This design in the manner of a film hinge yields especially good transfer of compressive forces from the outer edge to the sensor element.

Preferably, the sensor element is positioned to slope obliquely inwardly from top to bottom. This arrangement is best suited both for detection of pinching on the front edge of a closing sliding roof cover and also for detection of pinching on the rear edge of a lowering cover of a sliding and lifting roof.

The sensor element, which is preferably made in the form of a strip, extends in the cover of a sliding roof at least in the area of the front edge, and in a cover with a rear edge which can be raised over the fixed motor vehicle roof, such as a sliding and lifting roof or a lifting roof, also at least over part of the area of the rear edge. However, the sensor element can also be located peripherally along the entire outer perimeter of the cover.

These and further objects, features and advantages of the present invention will become apparent from the following description when taken in connection with the accompanying drawings which, for purposes of illustration only, show several embodiments in accordance with the present invention.

DETAILED DESCRIPTION OF THE INVENTION

In a fixed motor vehicle roof 1, there is a roof opening 5 which can be selectively closed or at least partially exposed by means of a cover labeled 2 as a whole. In this case, the cover 2 is assigned to a sliding and lifting roof with a rear edge which, by a conventional mechanism (not shown) in the side area of the cover, can be raised over the fixed motor vehicle roof 1 and with a rear edge which, on the other hand, can be lowered under the fixed motor vehicle roof 1 and which can be shifted to the rear.

Figure 1:
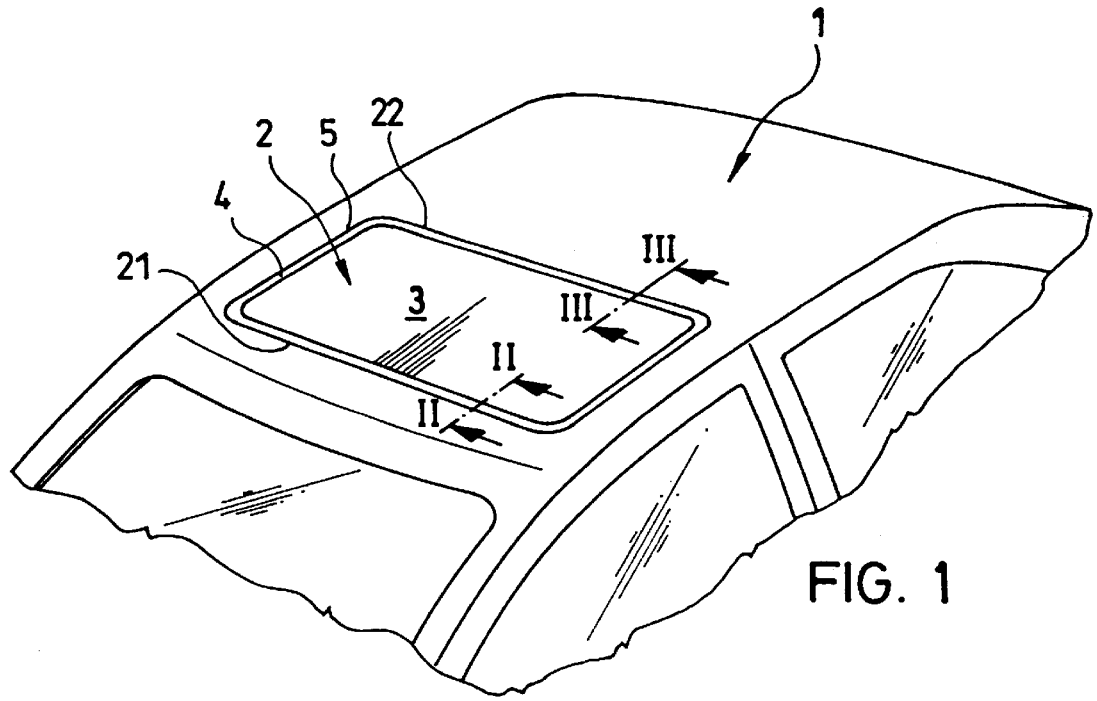
FIG. 1 is a perspective view schematically depicting an openable motor vehicle roof.
Figure 2:
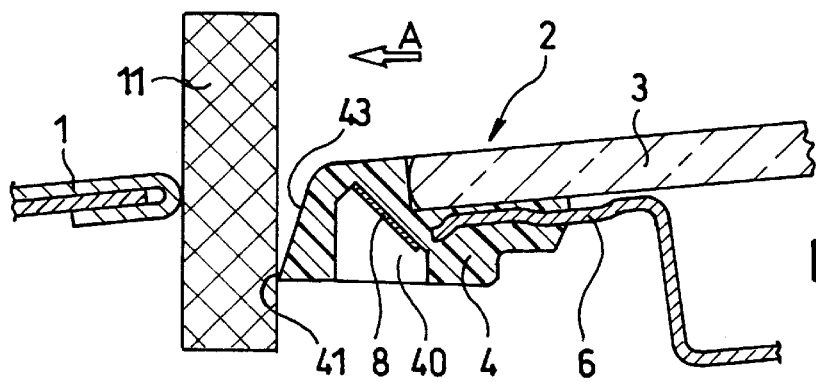
FIG. 2 is a partial longitudinal section through the edge of the cover and the bordering motor vehicle roof with a pinched article in the area of the front edge of the cover.
Figure 3:
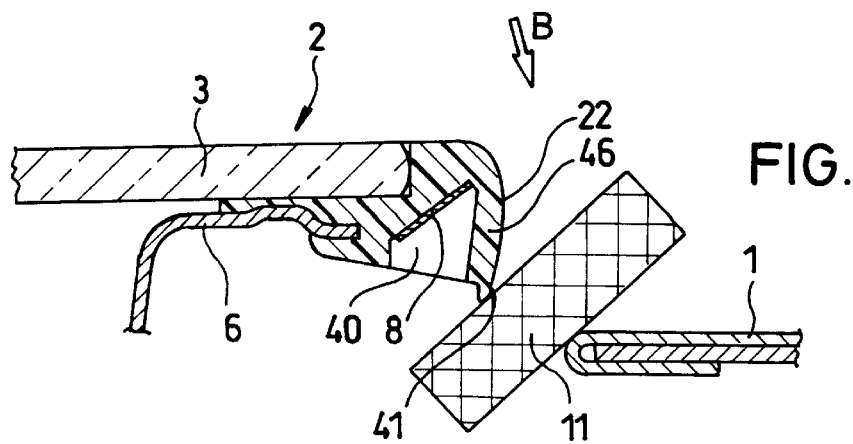
FIG. 3 shows a partial longitudinal section with a pinched article in the area of the rear edge of the cover.

The cover 2, as shown in FIGS. 2 and 3, in a motorized closing process, can pinch an article 11 or body parts both at the front edge of the cover 2 (FIG. 2) and also in the area of the rear edge of the cover 2 (FIG. 3) between the cover and the fixed motor vehicle roof 1 during closing. For motor vehicle parts which close automatically by motor, regulations prescribe monitoring by means of sensors, which in the case of pinching limits, the pinching force to 100 newtons.

The cover 2 is composed of a cover plate 3 made preferably of glass, alternatively also of transparent plastic, an attachment part located in the area of the outer edge, here inside cover sheet 6, and a plastic frame 4 which joins the two parts 3 and 6, and which is produced by peripheral foaming or injection of the cover plate 3 and the attachment part 6 in a mold.

According to the invention, it is provided that at least one strip-shaped sensor 8 is integrated into the plastic frame 4 and is actuated in the case of pinching during closing of the cover 2 by partial deformation of the plastic frame 4 which thus signals that pinching of a body part or article has occurred. The sensor element 8 can be, for example, a FSR element (force sensing resistor) as is known from the German Patent Application DE 44 27 537 A1 mentioned above. Under pressure, this sensor element changes its resistance so that a deformation which indicates a case of pinching can be easily recognized by means of an evaluation logic.

Preferably, a groove 40 which is downwardly open and can be made roughly of an inverted V shape, or even trapezoidal, is formed into the plastic frame 4. The outwardly facing wall of an outer peripheral rib 46 of the plastic frame 4 is a contact surface 43 which is sloped from top to bottom to drop obliquely outwardly. The underlying outer edge 41 which projects farthest to the left in FIG. 2, when it moves in the arrow direction A, is the first part of the frame 4 to come into contact with the pinched article 11. The contact surface 43, which extends upwardly form edge 41, in the closed case is used to make contact with the fixed motor vehicle roof 1 or a seal (not shown) located on the roof 1.

Figures 4, 5, 6:
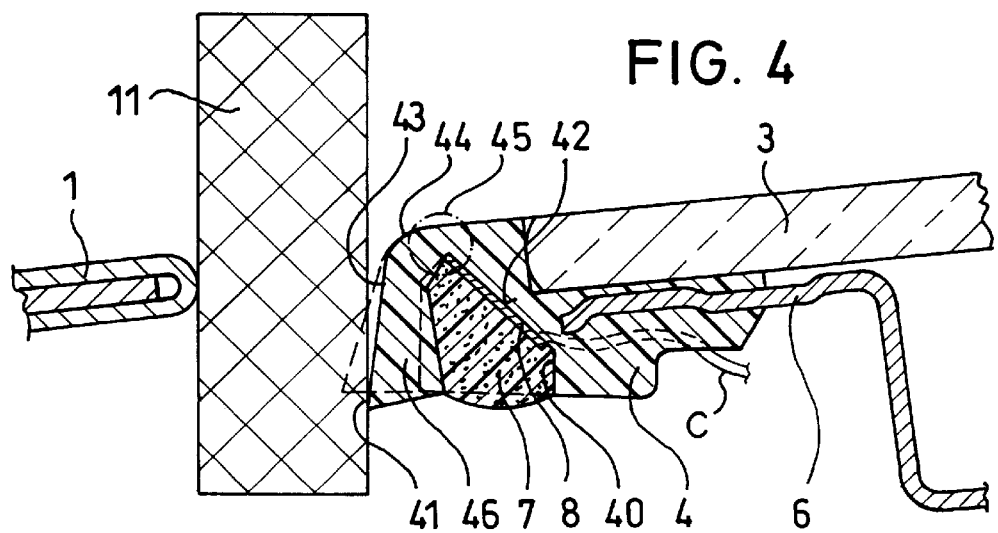
FIG. 4 shows an enlarged detailed representation of arrangement of FIG. 2, but with a softer material inserted into the sensor-receiving groove.
FIG. 5 shows an alternative embodiment of FIGS. 2–4 with a sensor element provided with a pressure nub.
FIG. 6 shows an alternative to FIG. 5 with a pressure nub on an inside wall of the plastic frame.

As shown in FIGS. 2–4, the sensor element 8 is preferably located on an inner wall 42 of the groove 40, which slopes obliquely downward in an inward direction. The circled area 45 (FIG. 4) of the plastic frame 4, which extends above the base of the groove 40, is made relatively thin-walled, and when the outside edge 41 meets a pinched article 41, area 45 acts like an elastic film hinge so that the rib 46 can bend inwardly a relatively slight amount. In this case, the sensor element 8 is deformed in its upper region within the circled area 45, by which a perceptible change of resistance can occur.

According to one advantageous development, the entire interior of groove 40 is filled with a material which is softer than the material of the plastic frame 4 and which acts as an elastic buffer to transfer compressive force to the sensor element 8 when the rib 46 deforms. FIG. 4 shows the undeformed state of the rib 46 and of the softer material 7 in broken lines and the deformed state in solid lines.

Just as when pinching occurs on the front edge, as shown in FIG. 2 or 4, when the rear edge of the cover 2 is lowered (in the direction of arrow B in FIG. 3) pinching of an article 11 is detected by means of the sensor element 8 by the deformation of the contact surface 43 and of the likewise softer material 7 present in groove 40.

The upper edge 44 of the plastic frame 4 is conventionally flush with the upper edge of the cover plate 3. The inside cover sheet 6 is used to stiffen the cover 2 and to attach additional side sheets or to connect the cover to its displacement mechanism by means of lifting levers or cranks. The inside cover sheet 6 can be made in one or more parts.

In the version shown in FIG. 5, the sensor element 8 has at least one pressure nub 9 which faces the outer edge of the plastic frame 4 and which is used to increase sensitivity when a compressive force F acts on the front edge 21 or the rear edge 22 of cover 2.

In the version as shown in FIG. 6, on the other hand, there is a pressure nub 10 on the inner surface of bridge 46 forming the outer wall of the groove 40. In this way, deformation of the rib 46 under the action of a force F acts via the pressure nub 10 in is concentrated in a spot on sensor element 8, resulting in earlier detection of pinching.

The cover 2 is preferably produced in a two-part injection or casting mold into which the cover plate 3 and the inside cover sheets 6 are inserted, and which defines outside contour of the plastic frame 4. The sensor element 8 can be integrated either directly into the plastic frame 4 during injection, casting or foaming, or it can be held by a tool part which can move roughly normal to the cover plate 3, and is thus joined to the material of the plastic frame 4 during injection or foaming. This tool part then forms the groove 40 when removed. The groove can then be filled, in the course of the 2-component injection or foaming process, with the softer elastic material 7. For example, polyurethane (PU) with a Shore hardness of roughly 90 is suitable as the material for the plastic frame 4; for the softer elastic material a PU foam with a Shore hardness of roughly 30 can be used. Furthermore, establishment of contact between the sensor element 8 and evaluation logic is also especially facilitated since the electrical terminal connections C (FIG. 4) can be easily embedded at the same time as the plastic frame 4 is peripherally injected or foamed about the glass pane 3 and the reinforcing parts.

Instead of direct introduction of the sensor element 8 into the plastic frame 4 during injection or foaming or casting, subsequent introduction of the sensor element 8 by cementing into a molded groove 40 is possible. The groove 40 can also be filled with a softer material, likewise, in a separate working process.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Cover of an openable motor vehicle roof comprising a cover plate which is surrounded in at least one edge area by a molded-on plastic frame, and at least one sensor element integrated into the plastic frame, said sensor being actuated for issuing of a signal by partial deformation of the plastic frame due to pinching of a body part or article between the cover and an edge of a roof, in an installed condition the cover in the motor vehicle roof, when the cover is moved toward a closed position thereof; and wherein the sensor element is mounted in a groove in an underside of the plastic frame.

2. Cover as claimed in claim 1, wherein a pressure nub is provided on the sensor element, said pressure nub facing an outer edge of the plastic frame.

3. Cover as claimed in claim 1, wherein at least one pressure nub is provided on a wall defining the groove facing the sensor element.

4. Cover as claimed in claims 1, wherein the groove is filled with an elastic material which is softer than the plastic of the frame.

5. Cover as claimed in claim 1, wherein the sensor element is cemented to a wall defining the groove.

6. Cover as claimed in claim 1, wherein electrical terminal connections of the sensor element are embedded into the plastic of the plastic frame.

7. Cover as claimed in claim 1, wherein the frame has a contact surface on the outside edge of the cover; and wherein said contact surface is inclined obliquely downward in a direction away from the cover plate from an upper outer corner toward a lower outer corner of the frame.

8. Cover as claimed in claim 1, wherein the groove extends into proximity with a top edge of the plastic frame forming a hinge for a rib which extends on an outside edge of the plastic frame and bounds an outer side of the groove.

9. Cover as claimed in claim 1, wherein the sensor element is positioned inclined in a direction extending obliquely downward from an upper outer corner of said frame toward a lower inner corner of said frame.

10. Cover as claimed in claim 1, wherein the sensor element is strip-shaped and extends at least in an area of a front edge of the cover.

11. Cover as claimed in claim 6, wherein the sensor element is embedded completely into the elastic material in the groove.

12. Cover as claimed in claim 11, wherein a pressure nub is provided on the sensor element, said pressure nub facing an outer edge of the plastic frame.

13. Cover as claimed in claim 11, wherein at least one pressure nub is provided on a wall defining the groove facing the sensor element.

14. An openable motor vehicle roof comprising a fixed vehicle roof, an opening formed in the fixed vehicle roof and a movable cover plate mounted in said opening and which is surrounded in at least one edge area by a molded-on plastic frame, at least one sensor element being integrated into the plastic frame, said sensor being actuated for issuing of a signal by partial deformation of the plastic frame due to pinching of a body part or article between the cover and an edge of fixed vehicle roof defining said opening when the cover is moved from a position at least partially exposing the opening in the fixed vehicle roof toward a position closing said opening; wherein the sensor element is mounted in a groove in an underside of the plastic frame.

15. Vehicle roof as claimed in claim 14, wherein the groove extends into proximity with a top edge of the plastic frame forming a hinge for a rib which extends on an outside edge of the plastic frame and bounds an outer side of the groove.

16. Vehicle roof as claimed in claims 14, wherein the groove is filled with an elastic material which is softer than the plastic of the frame.

17. Vehicle roof as claimed in claim 14, wherein the sensor element is attached to a wall defining the groove.

* * * * *